(12) United States Patent
von Meyerinck

(10) Patent No.: US 7,415,990 B2
(45) Date of Patent: Aug. 26, 2008

(54) HEADPIECE FOR FUELING SYSTEMS

(76) Inventor: Wolfgang von Meyerinck, Daubringer Strasse 43, Lollar (DE) D-35457

( * ) Notice: Subject to any disclaimer, the term of this patent is extended or adjusted under 35 U.S.C. 154(b) by 229 days.

(21) Appl. No.: 10/952,614

(22) Filed: Sep. 29, 2004

(65) Prior Publication Data

US 2006/0011242 A1    Jan. 19, 2006

(30) Foreign Application Priority Data

Jul. 13, 2004    (EP) .................................. 04016427

(51) Int. Cl.
*B67D 5/70*    (2006.01)
(52) U.S. Cl. ...................... 137/615; 141/387
(58) Field of Classification Search ................ 137/615; 141/387; 285/145.2, 147, FOR. 150, 147.2
See application file for complete search history.

(56) References Cited

U.S. PATENT DOCUMENTS

| | | | | |
|---|---|---|---|---|
| 1,885,886 A | * | 11/1932 | Banks | 285/98 |
| 2,957,489 A | * | 10/1960 | Fisher | 137/142 |
| 3,651,832 A | | 3/1972 | Meyer | |
| 3,891,004 A | | 6/1975 | Knight | |
| 4,109,688 A | * | 8/1978 | Jameson | 141/387 |
| 4,341,242 A | * | 7/1982 | Hermanson | 137/615 |
| 4,653,554 A | * | 3/1987 | Von Meyerinck et al. | 141/387 |
| 4,658,874 A | | 4/1987 | von Meyerinck et al. | |
| 4,883,229 A | * | 11/1989 | Moeller | 239/587.2 |
| 4,898,211 A | * | 2/1990 | Fournier et al. | 137/615 |
| 4,993,463 A | | 2/1991 | von Meyerinck et al. | |
| 5,649,573 A | * | 7/1997 | Crum et al. | 141/67 |
| 6,701,980 B2 | * | 3/2004 | Rothrock | 141/231 |
| 7,185,685 B2 | * | 3/2007 | von Meyerinck | 141/387 |

FOREIGN PATENT DOCUMENTS

| | | |
|---|---|---|
| DE | 3523472 | 8/1986 |
| EP | 0 166 800 | 1/1986 |
| EP | 0 394 543 A1 | 10/1990 |

* cited by examiner

*Primary Examiner*—Stephen M. Hepperle
*Assistant Examiner*—Craig M Schneider
(74) *Attorney, Agent, or Firm*—Fredrikson & Byron, P.A.

(57) ABSTRACT

The invention relates to a headpiece (01) for movable or fixed-position fueling systems (02) having a coupling member (03) for connection to a tank, in which multiple rigid pipe segments (06, 09, 12, 15, 18, 21, 22) are provided and in which the pipe segments (06, 09, 12, 15, 18, 21, 22) are attached to multiple swivel joints (04, 07, 10, 13, 16, 19) for adjustable spatial arrangement of the refueling coupling, and in which at least a first swivel joint (04) is able to swivel about a horizontal swivel axis (05) to enable adjustment of the height of the refueling coupling, and in which the first swivel joint (04) is attached to a directly adjacent second swivel joint (07) via a first rigid pipe segment (06), in which the second swivel joint (07) can also be swiveled about a horizontal swivel axis (08).

14 Claims, 1 Drawing Sheet

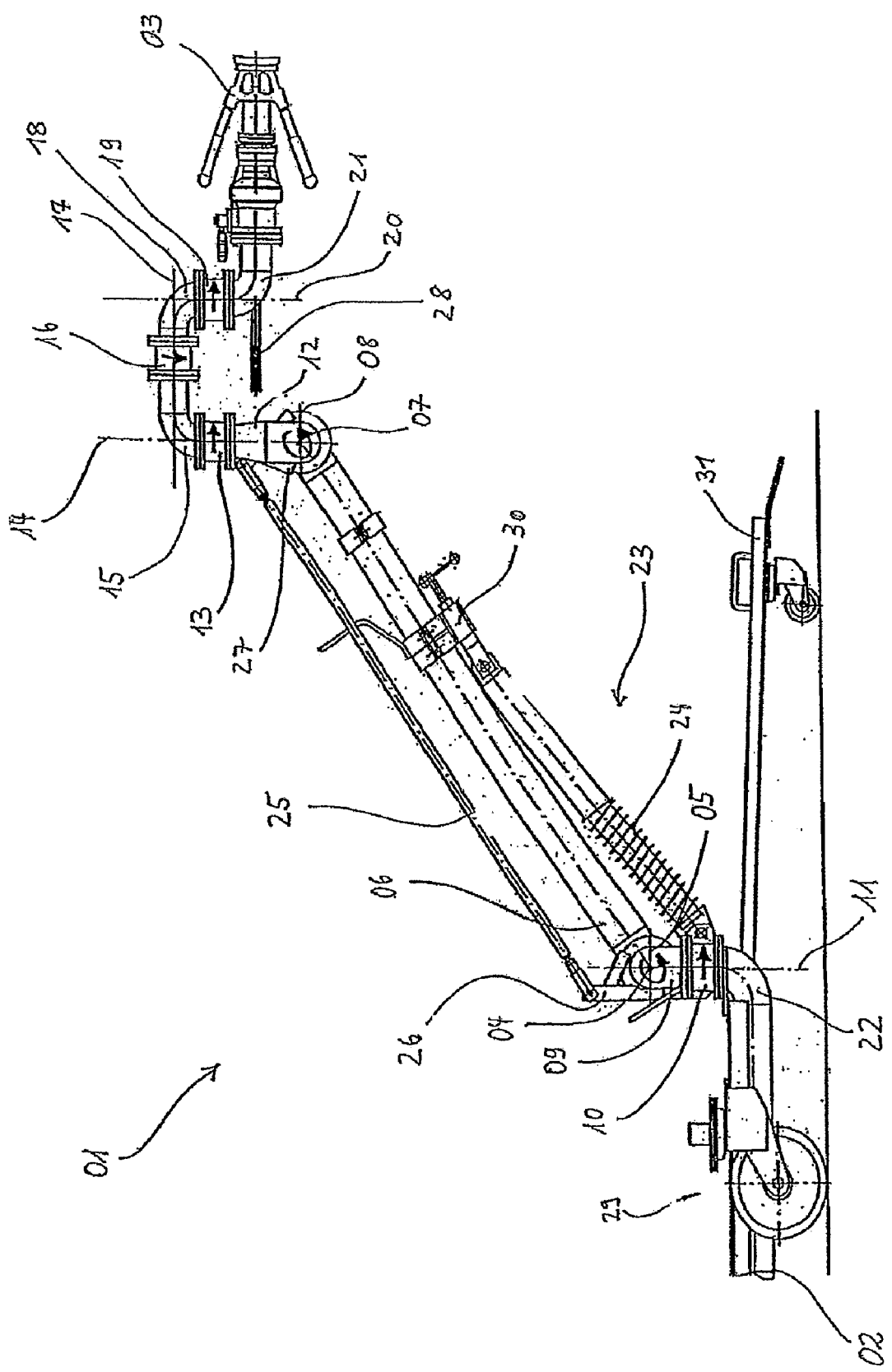

HEADPIECE FOR FUELING SYSTEMS

RELATED APPLICATIONS

The present Application claims the benefit of European Patent Application number 04016427.9 filed on Jul. 13, 2004. The entire disclosure of the above-mentioned patent application is hereby incorporated by reference herein.

DESCRIPTION

The invention relates to a headpiece for movable or fixed-position fueling systems having a coupling member for connection to a tank, a plurality of rigid pipe segments being provided to assure the flow of fuel.

When vehicles, and particularly aircraft, require refueling, especially when they are used in a military setting, large quantities of fuel must be transferred as rapidly as possible from a hydrant system, a fuel bowser or tanker to the tank that is to be replenished. For purposes of refueling, it is the last 20 to 30 meters from the fueling vehicle or hydrant system to the tank that cause particular difficulties.

Hoses are known from the related art that are furnished with a coupling member at the front end thereof, so that refueling can begin as soon as the device is coupled to the filling orifice.

A headpiece for movable or fixed-position fueling systems, which includes a coupling member for connection to the tank that is to be filled or emptied, is also known from European Patent No. EP 0 166 800 B1, in which the headpiece includes a pipeline constructed from five pipe segments, which are attached to each other by swivel joints, each of which has its own degree of freedom.

The disadvantage of the fueling systems known from the related art consists in that the known fueling systems are associated with considerable manipulation difficulties. For example, hoses represent a high risk to safety because of their vulnerability and sensitivity to heat, particularly when used close to hot turbines and motors or in the vicinity of turbines that are functioning. As a result of these disadvantages, it is essential to carry out intensive maintenance and at the same time inspection activities before, during and/or after every refueling operation. On the other hand, the significant disadvantage of the rigid headpieces and fueling systems known from the related art is that the rigid construction of the headpiece renders it very difficult to manipulate and extreme effort and the application of considerable force to connect it to the fueling union on the vehicle or aircraft that is to be refueled.

The object of the present invention is therefore to provide a hoseless headpiece for fueling installations that may be operated simply and without manipulation problems and may be attached to the aircraft union or other connectors with practically no application of force, that requires little maintenance, is suitable for both filling and emptying fuel tanks, and that provides the capability to connect the headpiece to the vehicle or aircraft with exceptionally little force.

In a manner that is already known, the headpiece for movable or fixed-position fueling systems includes a fueling coupling for connection to a tank, in which multiple rigid pipe segments are provided to assure the flow of fuel, the pipe segments being attached together by a plurality of swivel joints to allow adjustable spatial arrangement of the fueling coupling, and at least a first swivel joint being capable of swiveling about a horizontal swivel axis to allow height adjustment of the fueling coupling. The numbering of the swivel joint and pipe segments indicated for the headpiece according to the invention does not describe the order of the components on the headpiece, but serves merely to the indicated designators to be associated unambiguously with the components on the headpiece.

For the purposes of the invention, the suggested headpiece represents an innovation in that the first swivel joint is attached to a directly adjacent second swivel joint by a first rigid pipe segment, the second swivel joint also being capable of swiveling about a horizontal swivel axis.

This arrangement enables the headpiece to be orientated in practically any degree of freedom and to be attached to the fueling coupling of the vehicle or aircraft.

The second swivel joint may be disposed such that it is arranged downstream of the first swivel joint in the direction of flow during refueling.

The swivel joints may also be arranged such that the horizontal swivel axis of the first swivel joint and the horizontal swivel axis of the second swivel joint are aligned parallel with one another.

The swivel joints may further be arranged such that the first swivel joint may be attached to an immediately adjacent third swivel joint by a second rigid pipe segment, the third swivel joint being capable of swiveling about a vertical swivel axis.

The third swivel joint may itself be arranged upstream of the first swivel joint in the direction of flow during refueling.

The second swivel joint may also be attached to a directly adjacent fourth swivel joint via a third rigid pipe segment, the fourth swivel joint being capable of swiveling about a vertical swivel axis. The fourth swivel joint may in turn be arranged downstream of the second swivel joint in the direction of flow during refueling.

A further embodiment of the invention provides that vertical swivel axis of the third swivel joint and the vertical swivel axis of the fourth swivel joint may run parallel to one another. Then, the fourth swivel joint may be attached to a directly adjacent fifth swivel joint via a fourth rigid pipe segment, the fifth swivel joint being capable of swiveling about a horizontal swivel axis. In a further arrangement, the fifth swivel joint may be attached to a directly adjacent sixth swivel joint via a fifth rigid pipe segment, the sixth swivel joint being capable of swiveling about a swivel axis that may be offset by 90° relative to the horizontal swivel axis of the fifth swivel joint.

The sixth swivel joint may in turn be attached to the fueling coupling via a sixth rigid pipe segment, in which case the third swivel joint may be attached to the fueling system via a seventh rigid pipe segment.

A preferred embodiment of invention provides that a balancing arrangement may be provided on the headpiece, with which at least one pipe segment may be held in equilibrium. With the aid of this balancing arrangement, it is possible to align the headpiece in such a way that the refueling coupling may be attached to the tank coupling of the vehicle or aircraft easily and securely with minimal application of force.

In this context, the balancing arrangement itself may be designed such that it maintains the first rigid pipe segment in equilibrium. To this end, the balancing arrangement may be arranged between the first swivel joint and the second rigid pipe segment.

A further preferred embodiment of the invention provides that the balancing arrangement may include a pre-tensioned spring assembly. Of course, it is also conceivable to configure the balancing arrangement differently. The precise construction of the balancing arrangement is of no importance for the purposes of the invention.

A further, particularly preferred embodiment of the invention provides that pretensioning of the spring assembly may be adjustable. In this way, the balancing arrangement may also be modified to accommodate new force ratios after various rigid pipe segments or swivel joints have been extended or retracted.

An additional particularly preferred embodiment of the invention provides that the parallel lever drive may be provided on the headpiece, which may serve to maintain the vertical alignment of the vertical swivel axis of the fourth swivel joint when the first rigid pipe segment is swiveled about the horizontal swivel axis of the first swivel joint. This would ensure that the height of the refueling coupling may be adjusted particularly easily when it is connected to a tank.

The parallel lever drive may itself be designed in such manner that it may be formed by the first rigid pipe segment, the second rigid pipe segment, the third rigid pipe segment, and two linkage levers, in which case the first linkage lever may be immovably fixed in a vertical position and the second linkage lever may be aligned parallel to the first rigid pipe segment, and the second linkage lever may be attached in articulated manner to the third rigid pipe segment, and the second linkage lever may be attached in articulated manner to the first linkage lever.

An embodiment of the invention is described in greater detail with reference to the following drawing.

IN THE DRAWING

The FIGURE shows a side view of a headpiece of a fueling system according to the invention.

DETAILED DESCRIPTION

The headpiece 01 shown in the FIGURE is made up of several swivel joints 04, 07, 10, 13, 16, 19 and several rigid pipe segments 06, 09, 12, 15, 18, 21 and 22 attached to the swivel joints. A fueling coupling 03 is attached to sixth swivel joint 19 and downstream therefrom via a sixth rigid pipe segment 21. A handle 28 is also provided on rigid pipe segment 21, with which headpiece 01 may be guided. At its bottom end, headpiece 01 is attached via rigid pipe segment 22 to a fueling system 02, only part of which is shown in the drawing. In order to enable headpiece 01 to be moved, headpiece 01 is arranged on a platform-like trolley 29, only part of which is indicated in the FIGURE.

Trolley 29 may be moved manually via a drawbar 31.

Headpiece 01 may be positioned and aligned in almost any freedom of direction via the swivel joints 04, 07, 10, 13, 16 and 19 attached to headpiece 01. In order to ensure the most precise adjustment possible of headpiece 01 and to make insertion of refueling coupling 03 in the tank of the vehicle or aircraft as easy as possible, headpiece 01 is provided with a balancing arrangement 23. In this case, this balancing arrangement 23 essentially includes a pre-tensioned spring assembly 24, which may be adjusted via an adjusting mechanism 30. The pre-tensioning of spring assembly 24 may be adjusted via adjusting mechanism 30 in such manner that the pre-tensioning of spring assembly 24 may be selected so as to compensate for the weight of rigid pipe segments 06, 12, 15, 18, 21, refueling coupling 03, and swivel joints 07, 13, 16 and 19. Because of this weight compensation, one operator is able to connect the refueling coupling to the corresponding fueling port unaided.

In order to enable headpiece 01 to be secured to the fueling port of the vehicle or aircraft with as little effort as possible on the part of the operator, a parallel lever drive 25 is provided on headpiece 01. With the aid of this parallel lever drive 25, the vertical alignment of the vertical swivel axis 14 of fourth swivel joint 13 is maintained when first rigid pipe segment 06 is swiveled about the horizontal swivel axis 05 of first swivel joint 04. Parallel lever drive 25 is attached to swivel joints 04, 07 and rigid pipe segments 09 and 12 via two linkage levers 26, 27.

The arrangement of a parallel lever drive 25 of such kind in conjunction with the two horizontally rotatable pivot bearings 04 and 07 enables headpiece 01 to be repositioned very precisely and without requiring excessive effort. The arrangement of such a parallel lever drive 25 further ensures that refueling coupling 03 may be maintained securely in a given position, particularly a horizontal position, which renders connection to the fueling port of the vehicle or aircraft considerably easier.

In order to bring the refueling coupling 03 into the position necessary for connection to the fueling port for refueling, rigid pipe segments 15, 18, 21 are in the form of an arc. Refueling coupling 03 is conformed in known manner as a fueling dry coupling and is connected to the end of arcuate rigid pipe segment 21, enabling the pressurized pipeline to be connected to a correspondingly conformed fueling adapter. After the appropriate height adjustment has been made, refueling coupling 03 may be positioned suitably by vertical tilting and horizontal swiveling of pipe segments 15, 18, 21 via swivel joints 07, 16, and 19.

Since the headpiece is made up essentially of pipe segments, it may be used equally well for filling or emptying fuel tanks. The large number of swivel joints enable the connecting surface of refueling coupling 03 to be aligned in any direction in space.

A further advantage of the pipe sections or pipe segments consists in that the individual pipe segments are modified to satisfy the necessary fueling output, so that very rapid fueling time may be achieved.

In addition, the use of balancing arrangement 23 in conjunction with parallel lever drive 25 on headpiece 01 ensures simple and effortless operation by a single operator, since each vertical swivel axis is maintained vertical even while the height of refueling coupling 03 is adjusted, so that fourth pipe segment 15 cannot be tilted out of alignment.

Since headpiece 01 is not made from hoses, but instead from rigid pipe segments and swivel joints disposed therebetween, the pipe segments may also be equipped with wheels as needed, so that the entire fueling system may be made mobile.

LEGEND

01 Headpiece
02 Fueling system
03 Refueling coupling
04 First swivel joint
05 Horizontal swivel axis
06 First rigid pipe segment
07 Second swivel joint
08 Horizontal swivel axis
09 Second rigid pipe segment
10 Third swivel joint
11 Vertical swivel axis
12 Third rigid pipe segment
13 Fourth swivel joint
14 Vertical swivel axis
15 Fourth rigid pipe segment
16 Fifth swivel joint
17 Horizontal swivel axis
18 Fifth rigid pipe segment
19 Sixth swivel joint
20 Swivel axis 21 Sixth rigid pipe segment
22 Seventh rigid pipe segment
23 Balancing arrangement
24 Spring assembly
25 Parallel lever drive
26 Linkage lever
27 Linkage lever
28 Handle
29 Trolley
30 Adjusting mechanism
31 Drawbar

The invention claimed is:

1. A head piece (01) for movable or fixed-position fuelling systems (02) having a coupling member for connection to a tank (03), wherein a plurality of rigid pipe segments including a first rigid pipe segment (06), a second rigid pipe segment (09), a third rigid pipe segment (12), a fourth rigid pipe segment (15), a fifth rigid pipe segment (18), a sixth rigid pipe segment (21) and a seventh rigid pipe segment (22) are provided to assure the flow of fuel, and wherein the plurality of rigid pipe segments (06, 09, 12, 15, 18, 21, 22) are attached to a plurality of swivel joints including a first swivel joint (04), a second swivel joint (07), a third swivel joint (10), a fourth swivel joint (13), a fifth swivel joint (16) and a sixth swivel joint (19) for adjustable spatial arrangement of the refueling coupling, and wherein at least a first swivel joint (04) can be swiveled about a horizontal swivel axis (05) for adjusting the height of the refueling coupling,
characterized in that
the first swivel joint (04) is attached to a directly adjacent second swivel joint (07) by a first rigid pipe segment (06), the second swivel joint (07) also being capable of swiveling about a horizontal swivel axis (08);
the second swivel joint (07) is attached to a directly adjacent fourth swivel joint (13) via a third rigid pipe segment (12), the fourth swivel joint (13) being capable of swiveling about a vertical swivel axis (14) which is parallel to the the vertical swivel axis (11) of the third swivel joint (10), and wherein the fourth swivel joint (13) is arranged downstream of the second swivel joint (07) in the direction of flow during refueling;
the fourth swivel joint (13) is attached to an immediately adjacent fifth swivel joint (16) by a fourth rigid pipe segment (15), wherein the fifth swivel joint (16) is capable of swiveling about a horizontal swivel axis (17); and
the fifth swivel joint (16) is attached to an immediately adjacent sixth swivel joint (19) by a fifth rigid pipe segment (18), wherein the sixth swivel joint (19) is capable of swiveling about a swivel axis (20) that is offset by 90° relative to the horizontal swivel axis (17) of the fifth swivel joint (16).

2. The head piece according to claim 1,
characterized in that
the second swivel joint (07) is arranged downstream of the first swivel joint (04) in the direction of flow during refueling.

3. The head piece according to claim 1,
characterized in that
the horizontal swivel axis (05) of the first swivel joint (04) and the horizontal swivel axis (08) of the second swivel joint (07) run parallel to one another.

4. The head piece according to claim 1,
characterized in that
the sixth swivel joint (19) is attached to the coupling member (03) via a sixth rigid pipe segment (21).

5. The head piece according to claim 1,
characterized in that
the third swivel joint (10) is attached to the fuelling system (02) via a seventh rigid pipe segment (22).

6. The head piece according to claim 1,
characterized in that
the first swivel joint (04) is attached to an immediately adjacent third swivel joint (10) by a second rigid pipe segment (09), wherein the third swivel joint (10) is capable of swiveling about a vertical swivel axis (11).

7. The head piece according to claim 6,
characterized in that
the third swivel joint (10) is arranged upstream of the first swivel joint (04) in the direction of flow during refueling.

8. The head piece according to claim 1,
characterized in that
a balancing arrangement (23) is provided on the head piece (01), with which at least one pipe segment (06, 12, 15, 18, 21) and/or at least one swivel joint (07, 13, 16, 19) and/or the refueling coupling (03) is held in equilibrium.

9. The head piece according to claim 8,
characterized in that
the balancing arrangement (23) keeps at least the first rigid pipe segment (06) in equilibrium.

10. The head piece according to claim 9,
characterized in that
the balancing arrangement (23) braces the first rigid pipe segment (06) against the second rigid pipe (09).

11. The head piece according to claim 8,
characterized in that
the balancing arrangement (23) includes a pre-tensioned spring assembly (24).

12. The head piece according to claim 11,
characterized in that
the pre-tensioning of the spring assembly (24) is adjustable.

13. A head piece (01) for movable or fixed-position fuelling systems (02) having a coupling member for connection to a tank (03), wherein a plurality of rigid pipe segments including a first rigid pipe segment (06), a second rigid pipe segment (09), a third rigid pipe segment (12), a fourth rigid pipe segment (15), a fifth rigid pipe segment (18), a sixth rigid pipe segment (21) and a seventh rigid pipe segment (22) are provided to assure the flow of fuel, and wherein the plurality of rigid pipe segments (06, 09, 12, 15, 18, 21, 22) are attached to a plurality of swivel joints including a first swivel joint (04), a second swivel joint (07), a third swivel joint (10), a fourth swivel joint (13), a fifth swivel joint (16) and a sixth swivel joint (19) for adjustable spatial arrangement of the refueling coupling, and wherein at least a first swivel joint (04) can be swiveled about a horizontal swivel axis (05) for adjusting the height of the refueling coupling,
characterized in that
the first swivel joint (04) is attached to a directly adjacent second swivel joint (07) by a first rigid pipe segment (06), the second swivel joint (07) also being capable of swiveling about a horizontal swivel axis (08);
the second swivel joint (07) is attached to a directly adjacent fourth swivel joint (13) via a third rigid pipe segment (12), the fourth swivel joint (13) being capable of swiveling about a vertical swivel axis (14);
the fourth swivel joint (13) is attached to an immediately adjacent fifth swivel joint (16) by a fourth rigid pipe segment (15), wherein the fifth swivel joint (16) is capable of swiveling about a horizontal swivel axis (17);

the fifth swivel joint (16) is attached to an immediately adjacent sixth swivel joint (19) by a fifth rigid pipe segment (18), wherein the sixth swivel joint (19) is capable of swiveling about a swivel axis (20) that is offset by 90° relative to the horizontal swivel axis (17) of the fifth swivel joint (16); and a parallel lever drive (25) on the head piece (01), with which the vertical alignment of the vertical swivel axis (14) of the fourth swivel joint (13) is maintained when the first rigid pipe segment (06) is swiveled about the horizontal swivel axis (05) of the first swivel joint (04).

14. The head piece according to claim 13, characterized in that the parallel lever drive (25) is formed by the first rigid pipe segment (06), the second rigid pipe segment (09), the third rigid pipe segment (12), and two linkage levers (26, 27), wherein the first linkage lever (26) is immovably affixed in a vertical position to the second rigid pipe segment (09) and the parallel lever drive (25) is aligned parallel to the first rigid pipe segment (06), and the second linkage lever (27) is attached in articulated manner to the third rigid pipe segment (12), and wherein the second linkage lever (27) is attached in articulated manner to the first linkage lever (26).

* * * * *